(12) United States Patent
Tokutake

(10) Patent No.: US 10,417,496 B2
(45) Date of Patent: Sep. 17, 2019

(54) VISIBILITY ENHANCEMENT DEVICES, SYSTEMS, AND METHODS

(71) Applicant: SONY CORPORATION, Tokyo (JP)

(72) Inventor: Kenji Tokutake, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/890,783

(22) Filed: Feb. 7, 2018

(65) Prior Publication Data

US 2018/0239963 A1 Aug. 23, 2018

Related U.S. Application Data

(63) Continuation of application No. 14/634,367, filed on Feb. 27, 2015, now Pat. No. 9,940,521.

(51) Int. Cl.
*G06K 9/00* (2006.01)
*H04M 1/725* (2006.01)
(Continued)

(52) U.S. Cl.
CPC ......... *G06K 9/00671* (2013.01); *G06F 1/163* (2013.01); *G06F 1/1694* (2013.01); *G06F 3/011* (2013.01); *G06F 3/0412* (2013.01); *H04M 1/72522* (2013.01); *H04N 5/23293* (2013.01); *H04N 7/188* (2013.01); *G06F 2200/1637* (2013.01); *G06K 2209/21* (2013.01); *G06K 2209/27* (2013.01); *H04M 2250/52* (2013.01)

(58) Field of Classification Search
CPC .......... G02B 27/017; G02B 2027/0118; G06K 9/00624; G06K 9/00832; G06K 9/00362; G06T 7/0085; G06T 19/006
See application file for complete search history.

(56) References Cited

U.S. PATENT DOCUMENTS

| 8,462,109 B2* | 6/2013 | Nasiri ..................... A63F 13/06 345/158 |
| 2002/0044152 A1* | 4/2002 | Abbott, III .............. G06T 11/00 345/629 |

(Continued)

FOREIGN PATENT DOCUMENTS

| JP | 2008-304268 | 12/2008 |
| JP | 2009-237845 | 10/2009 |

(Continued)

OTHER PUBLICATIONS

Extended European Search Report dated Jul. 15, 2016 in Patent Application No. 15160188.7.

*Primary Examiner* — Vu Le
*Assistant Examiner* — Guillermo M Rivera-Martinez
(74) *Attorney, Agent, or Firm* — Xsensus LLP

(57) ABSTRACT

Embodiments include systems of and methods for an electronic device having a camera configured to capture image data, a display configured to display the captured image data and content corresponding to an application of the electronic device, and a motion sensor configured to detect motion of the electronic device. The electronic device also includes circuitry configured to activate the camera when motion is detected by the motion sensor, and control the display to display at least a portion of the captured image data at a size proportional to an amount of motion as detected by an output of the motion sensor.

19 Claims, 16 Drawing Sheets

(51) Int. Cl.
*G06F 3/041* (2006.01)
*H04N 5/232* (2006.01)
*H04N 7/18* (2006.01)
*G06F 1/16* (2006.01)
*G06F 3/01* (2006.01)

(56) References Cited

U.S. PATENT DOCUMENTS

| | | | | |
|---|---|---|---|---|
| 2011/0187725 A1* | 8/2011 | Matsuda | ............... | G06F 3/017 |
| | | | | 345/473 |
| 2011/0304833 A1* | 12/2011 | Osaka | ................. | G03B 21/00 |
| | | | | 353/85 |
| 2012/0212414 A1* | 8/2012 | Osterhout | ............ | G02B 27/017 |
| | | | | 345/158 |
| 2013/0127980 A1* | 5/2013 | Haddick | ................ | G06F 3/013 |
| | | | | 348/14.08 |
| 2013/0336629 A1* | 12/2013 | Mulholland | ............. | H04N 9/87 |
| | | | | 386/230 |
| 2014/0228073 A1* | 8/2014 | Fratti | ................... | H04W 4/026 |
| | | | | 455/556.1 |
| 2014/0267403 A1* | 9/2014 | Maciocci | ............. | G06T 19/006 |
| | | | | 345/633 |
| 2015/0160071 A1* | 6/2015 | Kadosawa | ............ | G01H 11/08 |
| | | | | 73/658 |
| 2017/0011210 A1* | 1/2017 | Cheong | ................ | H04W 12/06 |

FOREIGN PATENT DOCUMENTS

| | | |
|---|---|---|
| JP | 2011-043419 | 3/2011 |
| JP | 2013-198107 | 9/2013 |

* cited by examiner

FIG. 5
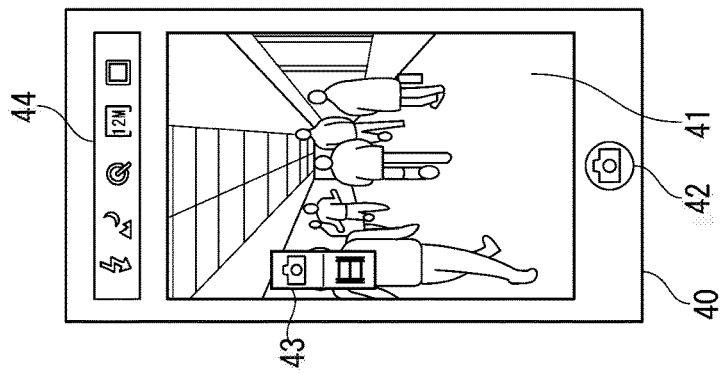
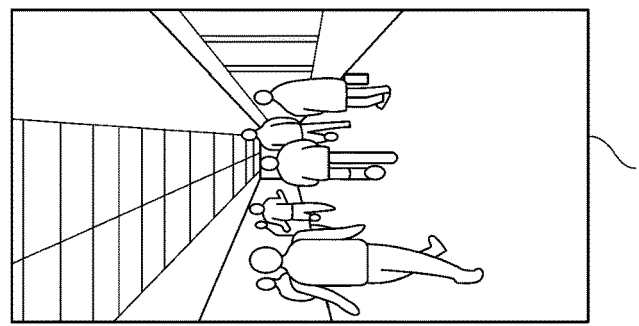
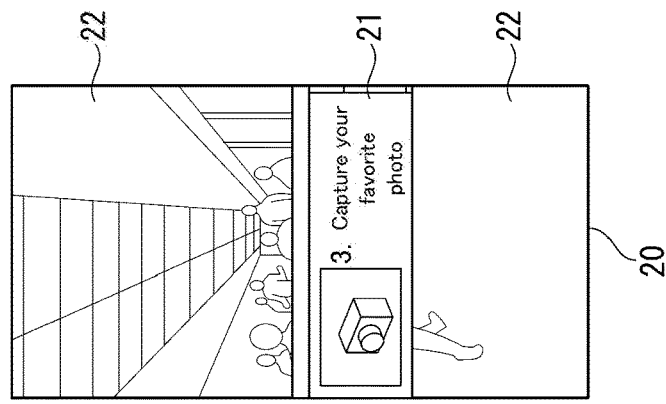
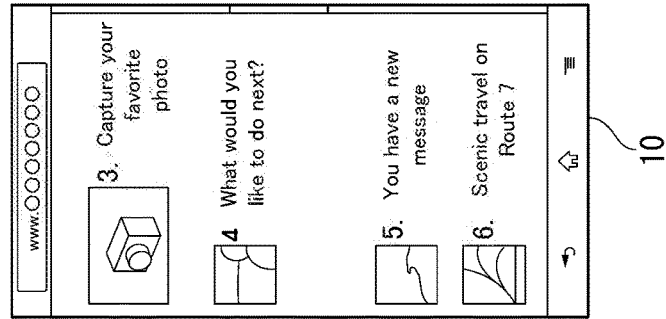

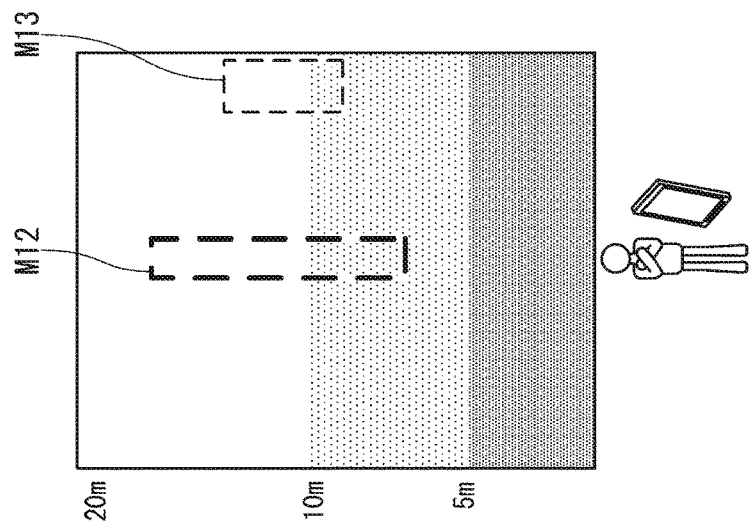
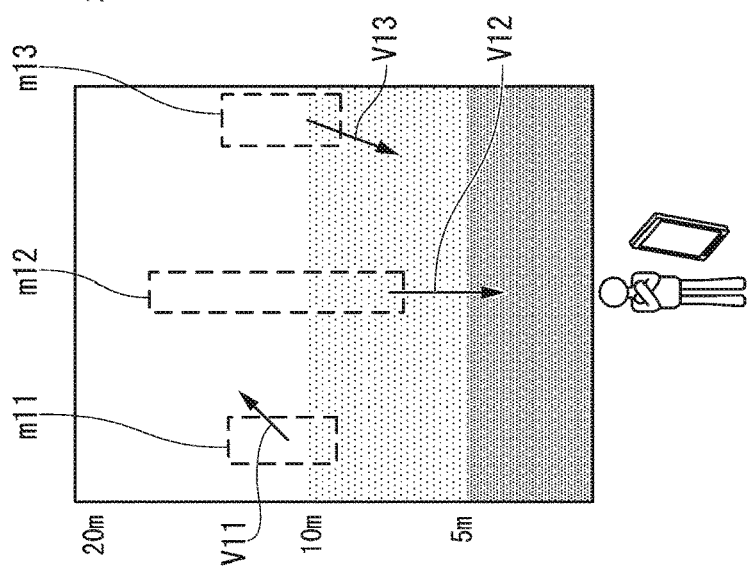
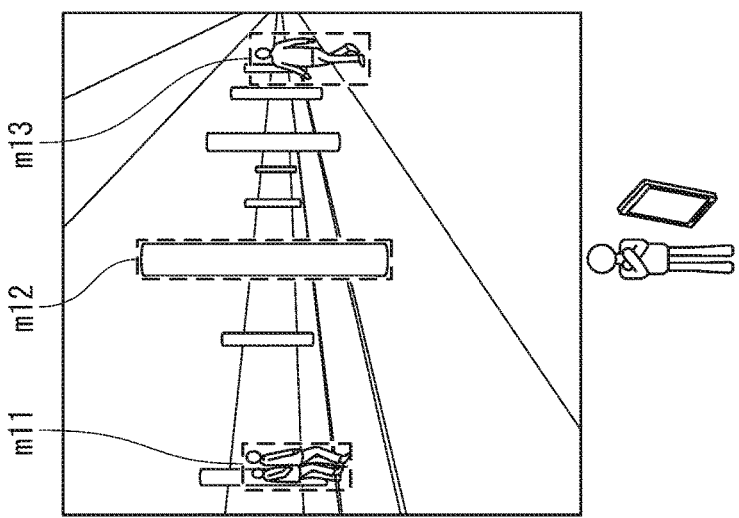

FIG. 12A
FIG. 12B
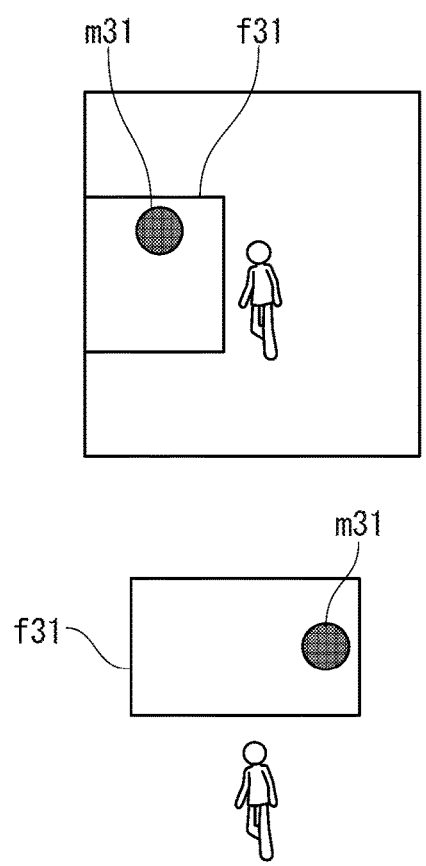
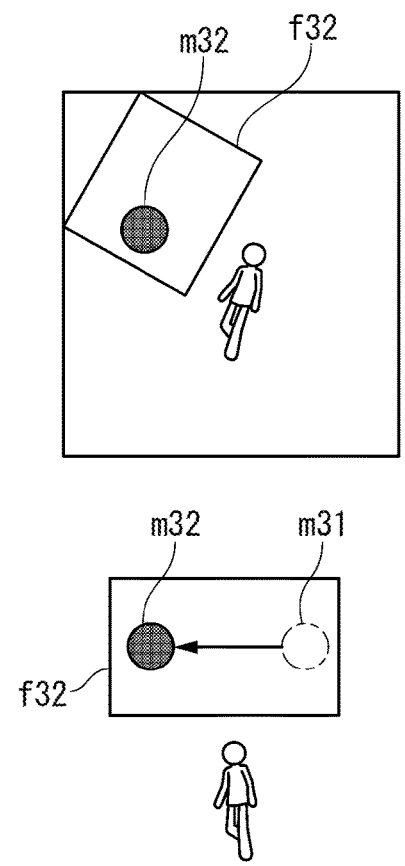

VISIBILITY ENHANCEMENT DEVICES, SYSTEMS, AND METHODS

CROSS-REFERENCE TO RELATED APPLICATIONS

This application is a continuation of U.S. application Ser. No. 14/634,367, filed Feb. 27, 2015, the entire contents of which are incorporated herein by reference.

BACKGROUND OF THE INVENTION

Field Of The Invention

Devices, systems, and methods for enhancing visibility are described. In particular, an electronic system receives, measures, and processes environmental and spatial input conditions, and outputs analyses and recommended action(s).

Description of the Related Art

When a user is engaging with an electronic device, the user is usually in a static state, such as sitting or standing still. A static state prevents the user from bumping into an object or person, and it helps the user to avoid running into a potentially dangerous situation. However, many users have a tendency to operate an electronic device while being mobile. This requires glancing frequently back and forth between the electronic device and the user's surroundings. As a result, input instructions are frequently inaccurate and/or the user bumps into something or someone.

SUMMARY OF THE INVENTION

Embodiments include an electronic device having a camera configured to capture image data, a display configured to display the captured image data and content corresponding to an application of the electronic device, and a motion sensor configured to detect motion of the electronic device. The electronic device has circuitry configured to activate the camera when motion is detected by the motion sensor, and to control the display to display at least a portion of the captured image data at a size proportional to an amount of motion as detected by an output of the motion sensor.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates multiple images on a display panel of an electronic device according to an embodiment;

FIGS. 10A-10C illustrate the mechanisms by which a user is alerted as a result of captured image(s) according to an embodiment;

FIGS. 12A-12B illustrate correction of a motion vector according to an embodiment;

Referring now to the drawings, wherein like reference numerals designate identical or corresponding parts throughout the several views.

DETAILED DESCRIPTION OF THE PREFERRED EMBODIMENTS

Embodiments herein describe electronic systems, devices, and methods which contribute towards enhanced visibility while engaging with or operating one or more electronic devices. The electronic systems, devices, and methods determine whether a user engaged with the system or device(s) is in a stationary state or a mobile walking or running state. When the user is in a mobile walking or running state, processes described herein enhance a user's awareness of his/her surroundings to assist the user towards a safer working environment.

Figure 1:
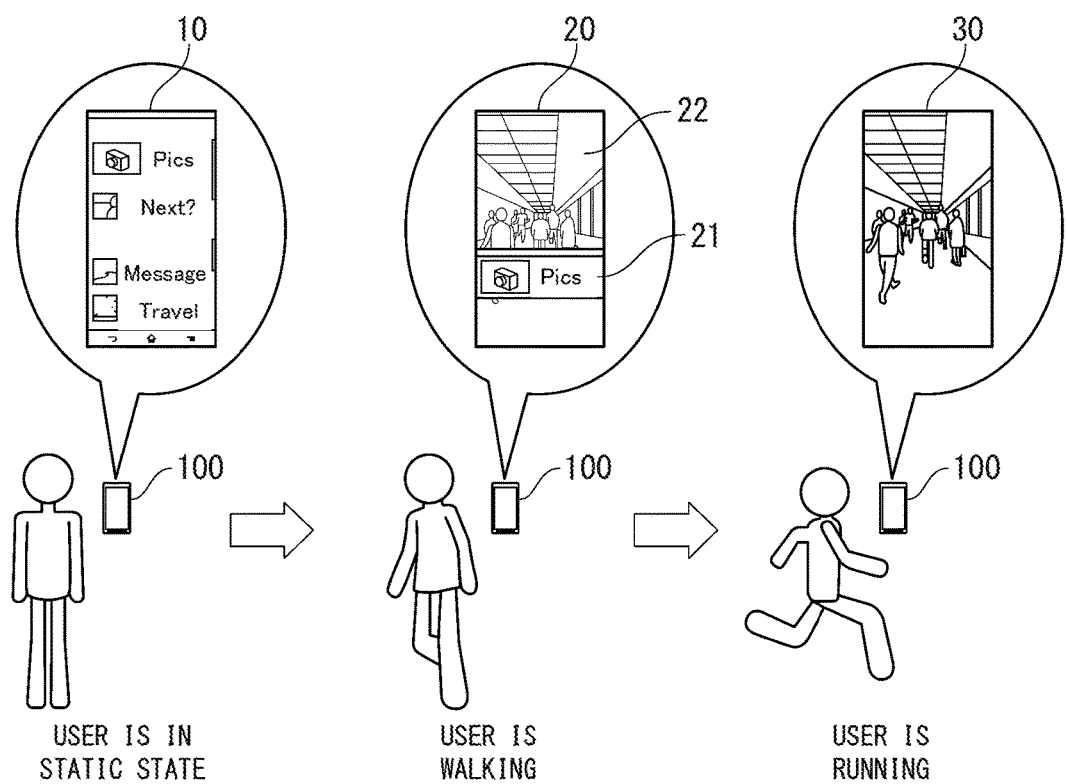
FIG. 1 illustrates different states in which a user may be operating an electronic device according to an embodiment.

FIG. 1 illustrates three different states in which a user may be operating or engaging with an electronic device 100, such as a smart phone, tablet, or other hand-held or wearable electronic device with a display. In addition, the electronic device 100 is equipped with an attached or built-in camera.

The left portion of FIG. 1 illustrates a user in a static state, such as, sitting or standing still while operating the electronic device 100. In a static state, the user can be primarily focused on an image 10 of the electronic device 100 with minimal attention focused on his/her surroundings. As a result, the image 10 is completely devoted to various applications with which the user is engaged, such as viewing a website, watching a streaming video, viewing mail, playing a video game, or any number of other electronic applications.

The middle portion of FIG. 1 illustrates a user in a walking state while operating the electronic device 100. In a walking state, an image 20 displayed on the electronic device 100 is a combined image of the user's application content 21 and an image of a real-time camera view 22 while the user is walking. The image 20 provides the advantage of displaying the user's combined electronic working environment and the user's physical environment, without requiring the user to glance back and forth between the two environments. The attached or built-in camera of the electronic device 100 provides an image of the user's surroundings upon the display of the electronic device 100 without the need to look away from the display to check out his/her surroundings.

The right portion of FIG. 1 illustrates a user in a running state while holding and/or operating the electronic device 100. A running state requires more attention directed to the user's physical surroundings to avoid a collision or entering into a potentially dangerous situation. Therefore, the display contains an image 30 completely directed to the user's surroundings as viewed from the attached or built-in camera of the electronic device 100.

The electronic device 100 includes a motion sensor, which detects an acceleration of the electronic device 100. When the acceleration increases to a first acceleration range, the electronic device 100 determines the user is in a walking state. When the acceleration increases to a second higher acceleration range, the electronic device 100 determines the user is in a running state. When the acceleration increases to a third acceleration range, the electronic device 100 determines the user is riding within a moving vehicle.

The electronic device 100 detects an approaching object from the camera image in real time in conjunction with processing circuitry of the electronic device 100. The electronic device 100 can warn the user of the approaching object with one or more screen displays and/or other signals, in addition to displaying the images 20 and 30.

Figure 2:
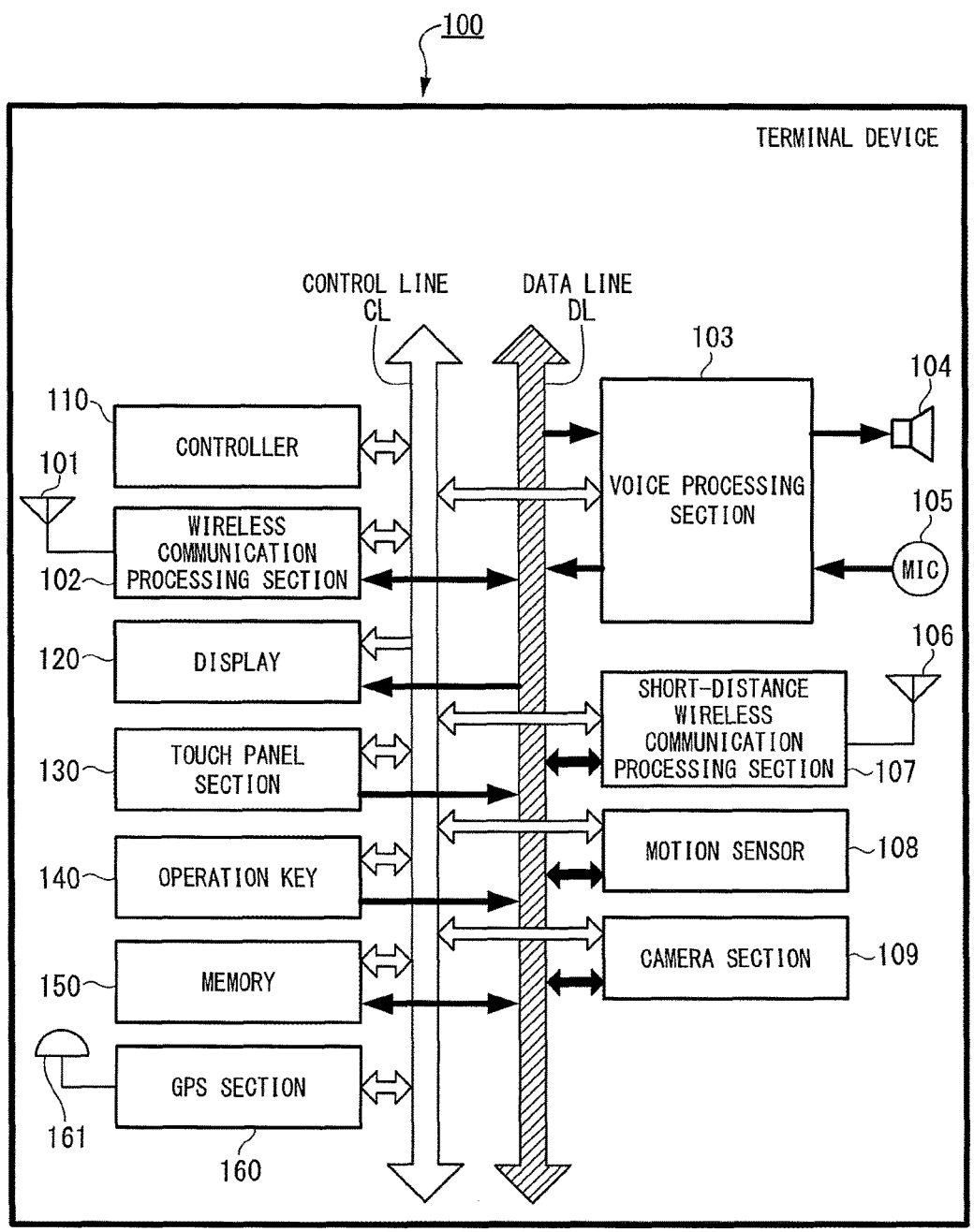
FIG. 2 is a block diagram illustrating an exemplary electronic device according to an embodiment.

FIG. 2 is a block diagram illustrating an exemplary electronic device according to certain embodiments of the present disclosure. In certain embodiments, electronic device 100 may be a smartphone. However, the skilled artisan will appreciate that the features described herein may be adapted to be implemented on other devices (e.g., a laptop, a tablet, a server an e-reader, a camera, a navigation device, etc.). The exemplary electronic device 100 of FIG. 2 include, a controller 110 and a wireless communication processor 102 connected to an antenna 101. A speaker 104 and a mica phone 105 are connected to a voice processor 103.

The controller 110 may include it more Central Processing Units (CPUs), and may control each element in the electronic device 100 to perform functions related to communication control, audio signal processing, control for the audio signal processing, and moving image processing and control, and other kinds of signal processing. The controller 110 may perform these functions by executing instructions stored in a memory 150. Alternatively or in addition to the local storage of the memory 150, the functions may be executed using instructions stored on an external device accessed on a network or on a non-transitory computer readable medium.

The memory 150 includes but is not limited to Read Only Memory (ROM), Random Access Memory (RAM), or a memory array including a combination of volatile and non-volatile memory units. The memory 150 may be utilized as working memory by the controller 110 while executing the processes and algorithms of the present disclosure. Additionally, the memory 150 may be used for long-term storage, e.g., of image data and information related thereto.

The electronic device 100 includes a control line CL and data line DL as internal communication bus lines. Control data to/from the controller 110 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication. The wireless communication processor 102 controls the communication performed between the electronic device 100 and other external devices via the antenna 101. For example, the wireless communication processor 102 may control communication between base stations for cellular phone communication.

The speaker 104 emits an audio signal corresponding to audio data supplied from the voice processor 103. The microphone 105 detects surrounding audio and converts the detected audio into an audio signal. The audio signal may then be output to the voice processor 103 for further processing. The voice processor 103 demodulates and/or decodes the audio data read from the memory 150 or audio data received by the wireless communication processor 102 and/or a short-distance wireless communication processor 107. Additionally, the voice processor 103 may decode audio signals obtained by the microphone 105.

The exemplary electronic device 100 may also include a display 120, a touch panel 130, an operation key 140, and a short-distance communication processor 107 connected to an antenna 106. The display 120 may be a Liquid Crystal Display (LCD), an organic electroluminescence display panel, or another display screen technology. In addition to displaying still and moving image data, the display 120 may display operational inputs, such as numbers or icons which may be used for control of the electronic device 100. The display 120 may additionally display a GUI for a user to control aspects of the electronic device 100 and/or other devices. Further, the display 120 may display characters and images received by the electronic device 100 and/or stored in the memory 150 or accessed from an external device on a network. For example, the electronic device 100 may access a network such as the Internet and display text and/or images transmitted from a Web server.

The touch panel 130 may include a physical touch panel display screen and a touch panel driver. The touch panel 130 may include one or more touch sensors for detecting an input operation on an operation surface of the touch panel display screen. The touch panel 130 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 130 may detect when the stylus approaches/contacts the operation surface of the touch panel display (similar to the case in which a finger is used for the touch operation).

In certain aspects of the present disclosure, the touch panel 130 may be disposed adjacent to the display 120 laminated) or may be formed integrally with the display 120. For simplicity, the present disclosure assumes the touch panel 130 is formed integrally with the display 120 and therefore, examples discussed herein may describe touch operations being performed on the surface of the display 120 rather than the touch panel 130. However, the skilled artisan will appreciate that this is not limiting.

For simplicity, the present disclosure assumes the touch panel 130 is a capacitance-type touch panel technology. However, it should be appreciated that aspects of the present disclosure may easily be applied to other touch panel types (e.g., resistance-type touch panels) with alternate structures.

In certain aspects of the present disclosure, the touch panel 130 may include transparent electrode touch sensors arranged in the X-Y direction on the surface of transparent sensor glass.

The touch panel driver may be included in the touch panel 130 for control processing related to the touch panel 130, such as scanning control. For example, the touch panel driver may scam each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 may detect a position of a user's finger around an edge of the display panel 120 (e.g., gripping a protective case that surrounds the display/touch panel). Signals may be transmitted by the touch panel driver, e.g. in response to a detection of a touch operation, in response to a query from another element based on timed data exchange, etc.

The touch panel 130 and the display 120 may be surrounded by a protective casing, which may also enclose the other elements included in the electronic device 100. In certain embodiments, a position of the user's fingers on the protective casing (but not directly on the surface of the display 120) may be detected by the touch panel 130 sensors. Accordingly, the controller 110 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 110 may be configured to detect which hand is holding the electronic device 100, based on the detected finger position. For example, the touch panel 130 sensors may detect a plurality of fingers on the left side of the electronic device 100 (e.g., on an edge of the display 120 or on the protective casing), and detect a single finger on the right side of the electronic device 100. In this exemplary scenario, the controller 110 may determine that the user is holding the electronic device 100 with his/her right hand because the detected grip pattern corresponds to an expected pattern when the electronic device 100 is held only with the right hand.

The operation key 140 may include one or more buttons or similar external control elements, which may generate an operation signal based on a detected input by the user. In addition to outputs from the touch panel 130, these operation signals may be supplied to the controller 110 for performing related processing and control. In certain aspects of the present disclosure, the processing and/or functions associated with external buttons and the like may be performed by the controller 110 in response to an input operation on the touch panel 130 display screen rather than the external button, key, etc. In this way, external buttons on the electronic device 100 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

The electronic device 100 may include a motion sensor 108. The motion sensor 108 may detect features of motion (i.e., one or more movements) of the electronic device 100. For example, the motion sensor 108 may include an accelerometer to detect acceleration, a gyroscope to detect angular velocity, a geomagnetic sensor to detect direction, a geo-location sensor to detect location, etc., or a combination thereof to detect motion of the electronic device 100. In certain embodiments, the motion sensor 108 may generate a detection signal that includes data representing the detected motion. For example, the motion sensor 108 may determine a number of distinct movements in a motion (e.g., from start of the series of movements to the stop, within a predetermined time interval, etc.), a number of physical shocks on the electronic device 100 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 110, whereby further processing may be performed based on data included in the detection signal. The motion sensor 108 can work in conjunction with a Global Positioning System (GPS) section 160. The GPS section 160 detects the present position of the terminal device 100. The information of the present position detected by the GPS section 160 is transmitted to the controller 110. An antenna 161 is connected to the GPS section 160 for receiving and transmitting signals to and from a GPS satellite.

The electronic device 100 may include a camera section 109, which includes a lens and shutter for capturing photographs of the surroundings around the electronic device 100. In an embodiment, the camera section 109 captures surroundings of an opposite side of the electronic device 100 from the user. The images of the captured photographs can be displayed on the display panel 120. A memory section saves the captured photographs. The memory section may reside within the camera section 109 or it may be part of the memory 150. The camera section 109 can be a separate feature attached to the electronic device 100 or it can be a built-in camera feature.

Figure 3:
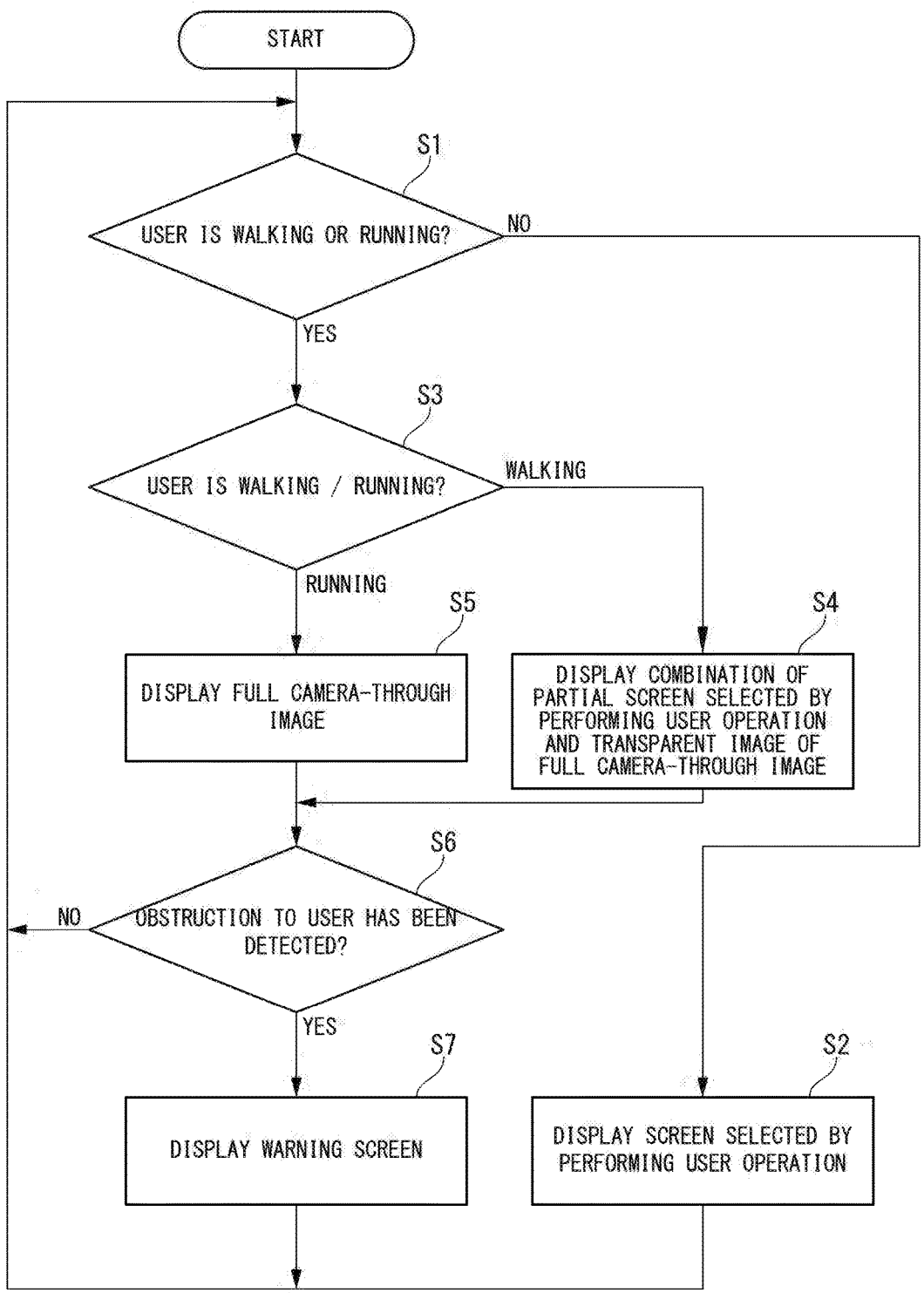
FIG. 3 is an exemplary flowchart illustrating control processing of a display according to an embodiment.

FIG. 3 is an exemplary flowchart illustrating control processing of a display, such as display panel 120 controlled by controller 110 of electronic device 100. In step S1, it is determined whether a user is walking or running. The controller 110 determines whether the user in possession of the electronic device 100 is in a walking or running state from detection data of the motion sensor 108. If the user is not in a walking or running state (a "no" decision in step S1), the process proceeds to step S2, wherein the controller 110 displays operations performed by the user on the display panel 120, such as a streaming video, e-mail, a video game, or any number of other electronic applications.

If the user is in a walking or running state (a "yes" decision in step S1) while holding the electronic device 100, it is determined in step S3 by the controller 110 whether it is a walking state or a running state. If the user is in a walking state, the process proceeds to step S4, wherein the controller 110 displays a combination of a partial screen selected by performing user operation(s) and a transparent image of a full camera-through image captured by the camera section 109 on the display panel 120. The combined image of the display panel 120 could be arranged in nearly equal proportions of the operations image and the camera image, or in unequal proportions according to pre-established parameters. Pre-established parameters could also determine which image appears in the top portion of the display panel 120 and which image appears in the bottom portion of the display panel 120. In an embodiment, one image could be split into a top portion and a bottom portion with the other image appearing in the middle portion of the display panel 120. If the user is in a running state, the process proceeds to step S5, wherein the controller 110 displays a full camera-through image captured by the camera section 109 entirely on the display panel 120. This allows the user to be totally focused on his/her fast-approaching surroundings while in a running state.

After steps S4 and S5, the process proceeds to step S6, where it is determined whether an obstruction to the user has been detected. The controller 110 can determine a potentially dangerous approaching object from data obtained by the motion sensor 108, the camera section 109, and/or the GPS section 160. If it is determined that an obstruction has not been detected (a "no" decision in step S6), the process returns to step S1. If it is determined that an obstruction has been detected (a "yes" decision in step S6), the controller 110 displays a warning message on the display panel 120 in step S7. The warning message could be based on several factors and variables. For example, a first level warning could be just a displayed message of the approaching object. A second level warning could be a flashing warning of the approaching object. A third level warning could be a flashing warning combined with an audible warning. The different warning levels could be based upon a velocity and/or acceleration rate or a range of velocity and/or acceleration determined by the motion sensor 108, the camera section 109, and/or the GPS section 160. After step S7, the process returns to step S1.

Figure 4:
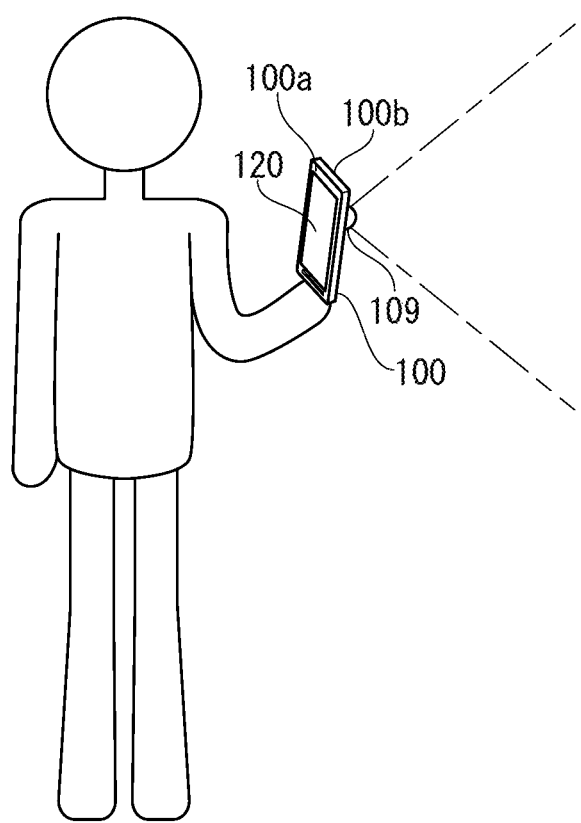
FIG. 4 illustrates a user holding an electronic device according to an embodiment.

FIG. 4 illustrates how the electronic device 100 is held or used by a user in a static, walking, or running state. The electronic device 100 is frequently held in one hand, while the user views the screen of the display panel 120 arranged in a surface 100a of the electronic device 100. An outer side surface 1001 of the electronic device 100 has a camera 109 positioned to view a user's front-approaching surroundings.

FIG. 5 illustrates multiple images on a display panel 120 of an electronic device 100. Image 10 illustrates several applications in which the user is currently working. Image 10 is an example of a displayed image when the user is in a static, position, such as sitting or standing still. Image 20 is an example of a displayed image when the user is in a walking state. Image 20 is a combined image of content 21 selected by operations of the user and an image 22 captured by the camera section 109. Content 21 is one part of the contents represented in image 10. However, content 21 is not limited to any one part of contents that are represented in image 10, and any other suitable content from image 10 can be used. For example, content 21 can be a zoomed-out view of some or all of the contents represented in image 10. Image 22 is a transparent image of a real-time moving image captured by the camera section 109. Although not illustrated in FIG. 5, contents at a back layer of image 22 can be seen through image 22, because image 22 is a transparent picture or layer. For example, if a user is displaying a home screen, a number of application icons and wallpaper included in the home screen can be viewed through image 22. Image 20 illustrates a portion of image 22 at the top of the display panel 120 and another portion of image 22 at the bottom of the display panel 120, wherein image 21 is positioned between the two portions of image 22. However, other arrangements and area proportions of images 21 and 22 are contemplated by embodiments described herein.

Image 30 is an example of a displayed image when the user is in a running state. The entire display panel 120 is dedicated to the real-time moving image captured by the camera section 109. This can be referred to as a full camera-through image. Since the user's surroundings are approaching the user at a rapid rate, the display panel 120 focuses entirely on the user's approaching surroundings in image 30. In another embodiment, image 30 of the user's surroundings could provide a telescopic view of his/her surroundings. This would allow the user to directly view the immediate close-up surroundings, plus provide a view of the forthcoming surroundings farther away in image 30 on the display panel 120.

FIG. 5 also illustrates an image 41, which is a displayed image captured by the camera section 109 on a screen 40. A shutter release 42 is displayed below image 41. Image 41 is recorded when the user touches the shutter release 42. A switch button 43 allows the user to switch between a moving image and a still image. One or more setup buttons 44 allow the user to select a shooting mode. The controller 110 can compare two images, such as image 30 and image 40. The controller 110 can be programmed to select image 30 of a running state over a non-running state to display as image 41 on the display panel 120.

Figure 6:
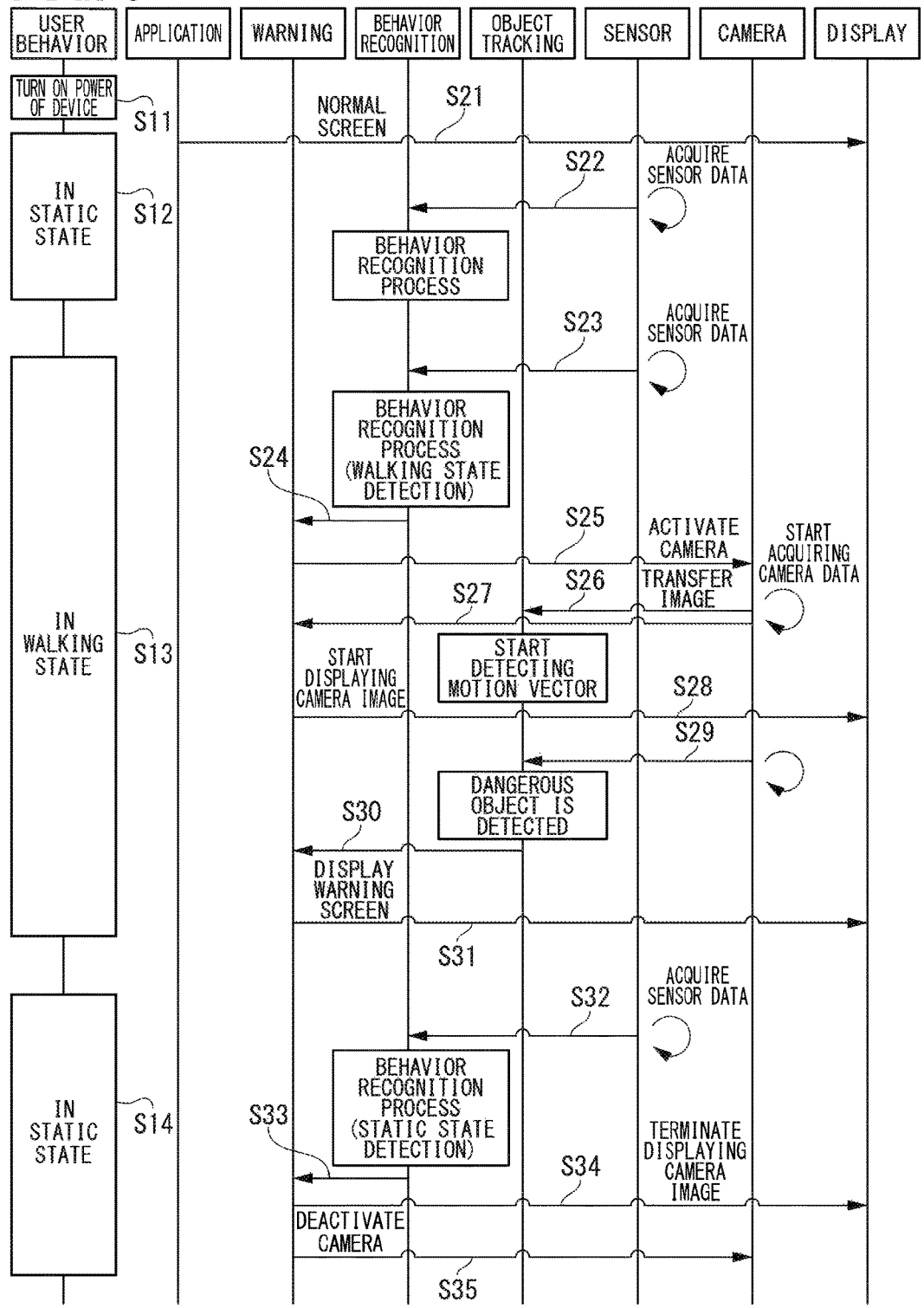
FIG. 6 illustrates a control sequence for an electronic device according to an embodiment.

FIG. 6 illustrates a control sequence for an electronic device in response to changes in a mobile state of a user in possession of the electronic device. In step S11, a user switches on the power supply of the electronic device 100. In step S12, the user is in a stationary state at the time of power activation, such as sitting or standing still. In step S13, the user is in a walking state as determined by a controller 110 from data obtained from a motion sensor 108. In step S14, the user returns to a static state.

When the power supply is switched on in step S11, an image on the display panel 120 is displayed according to the user's operations) and as controlled by the controller 110 in step S21. The display panel 120 is updated according to the user's input instructions. In step S22, the motion sensor 108 acquires sensory data in the background of the running applications of the electronic device 100. The sensory data acquired by the motion sensor 108 is forwarded to a behavior-recognition section of the controller 110.

A recognition process of the user's action(s) is detected from new sensory data from the motion sensor 108, whereby a walking state is detected by the controller 110 in step S23. In response to the newly-detected walking state, the behavior-recognition section of the controller 110 issues a wanting to begin capturing the user's surroundings in step S24. In step S25, the camera section 109 is activated to begin capturing the user's surroundings during the walking state. In step S26, image data is obtained by the camera section 109, which is transferred to an object-tracking section of the controller 110. The object-tracking section detects an object's motion vector from the transferred image data. In step S27, the image data obtained from the camera section 109 is transmitted to the warning section of the controller 110. In step S28, the warning section begins to display an image on the display panel 120 that was captured by the camera section 109. At this point, an information display screen 21 and a camera image 22 are displayed, such as image 20 illustrated in FIG. 5.

The image data obtained by the camera section 109 continues to be transferred to the object-tracking section of the controller 110 in step S29. At the object-tracking section, a specific range of the motion vector is detected. A specific range is a pre-determined range set that is used to detect the approach of an object with respect to the user. In step S30, the object-tracking section notifies the warning section that the motion vector of a specific range has been detected. In step S31, the warning section highlights the specific object that had been tracked as an image, which is displayed on the display panel 120. Examples of a highlighted object include, but are not limited to a heavy border about the object or a flashing object.

In step S32, a recognition process of the user's action(s) is detected from new, sensory data from the motion sensor 108, whereby the user is detected as now being in a static state by the behavior-recognition section of the controller 110. The behavior-recognition section has detected from the new sensory data that the user is no longer mobile. In step S33, the behavior-recognition section sends a warning message to discontinue capturing images of the user's surroundings and to discontinue displaying the captured images on the display panel 120. In step S34, the warning section discontinues displaying the camera image on the display panel 120. At this point, the display panel 120 only displays applications in which the user is currently working, such as image 10 in FIG. 5. In step S35, the warning section discontinues recording image data from the camera section 109.

Figure 7A:
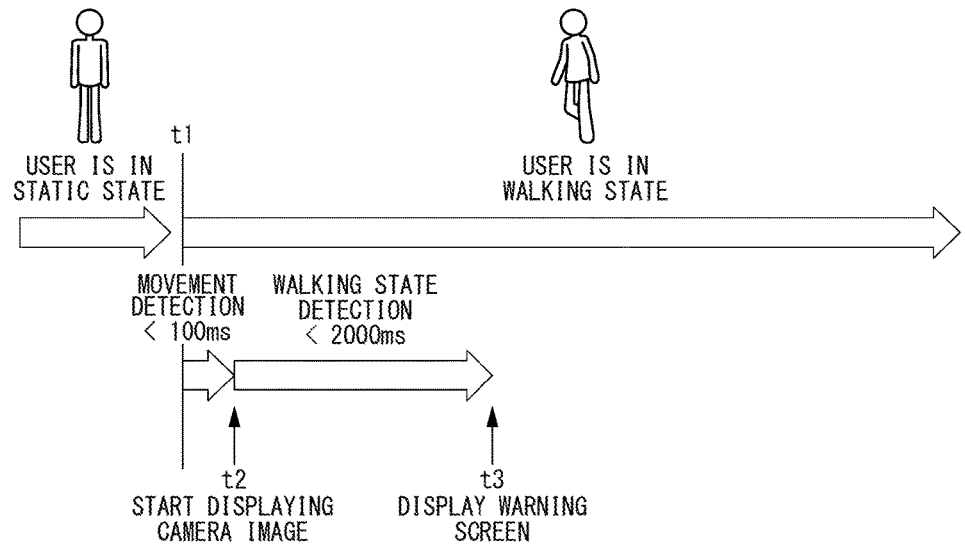
FIGS. 7A-7B illustrate exemplary timelines and accelerations in which a change of state is determined according to an embodiment.

FIG. 7A illustrates an exemplary timeline in which a change of state is determined by the controller 110 of the electronic device 100. In FIG. 7A, a user moves from a static state to a moving state at time t1. At time t2, movement of the electronic device 100 is detected, and the camera section 109 begins capturing an image. As an example, the time from t1 to t2 could be approximately 100 ms. However, other time frames for detecting a moving electronic device are contemplated by embodiments described herein. At time t3, the controller 110 has determined that the user's movement is a walking movement, and a warning message is sent to display the captured image by the camera section 109 to the display panel 120. As an example, the time from t2 to t3 could be approximately 2000 ms. However, other time frames for determining a walking state is contemplated by embodiments described herein.

FIG. 7A illustrates that a movement can be detected in a relatively short period of time. However, it takes a longer period of time to discriminate the type of movement, such as a walking state, a running state, or riding in a vehicle state. The controller 110 determines a walking movement after an initial acceleration within a short period of time, followed by a relatively constant velocity rate. For a running state, the increase in velocity and the initial ramping-up time period will be longer than for a walking state. When a user boards a vehicle, the increase in velocity will be higher for a moving vehicle compared to a running individual state. Stated another way, a walk is determined after a short period of time t1 at an initial acceleration rate a1, followed by a constant velocity v1. A running state takes a longer initial period of time t2 to ramp up to a particular running velocity v2 at a set acceleration rate a2. A vehicle riding state, is similar to a ramped-up running state having an initial period of time t3 (could be similar or approximately equal to t2), but the acceleration rate a3 will be higher than a2. Acceleration is defined as a change in velocity with a change in time.

Figure 7B:
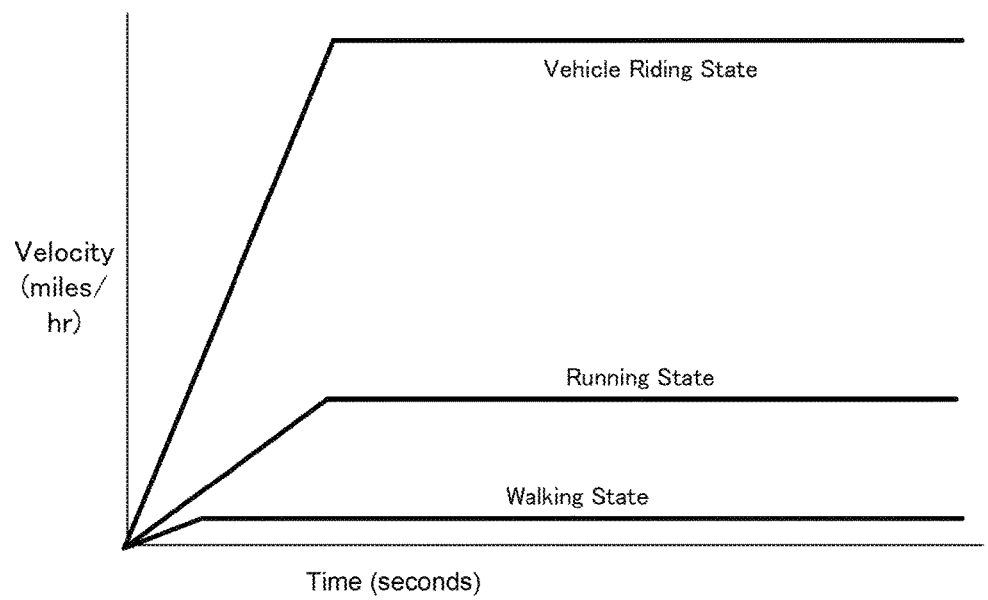

FIG. 7B is a graph illustrating the different behaviors associated with the three states of an individual walking, an individual running, and an individual riding in a vehicle. As an example, given for illustrative purposes only, a walking state can be achieved quickly (t1) at, a low rate of acceleration (a1) to a constant velocity (v1) of two miles per hour. A running state can be achieved at a particular rate of acceleration (a2>a1) over a longer initial period of time (t2>t1) to reach a constant velocity (v2>v1) of ten miles per hour. A vehicle riding state can be achieved at a higher rate of acceleration (a3>a2) than a running state, over a similar initial period of time (t3 approximately equal to or greater than t2) to reach a constant velocity (v3>v2) of forty miles per hour. Each of the three states has different behavior properties, and therefore can be recognized by the controller 110.

Behavior recognition can be realized in ways other than speed detection. For example, the pattern of vibration detected by motion sensor 108 can be used, such as the size of the vibration and the cycle of the vibration. The size of the vibration and the cycle of the vibration change when a user is walking versus running.

Figure 7C:
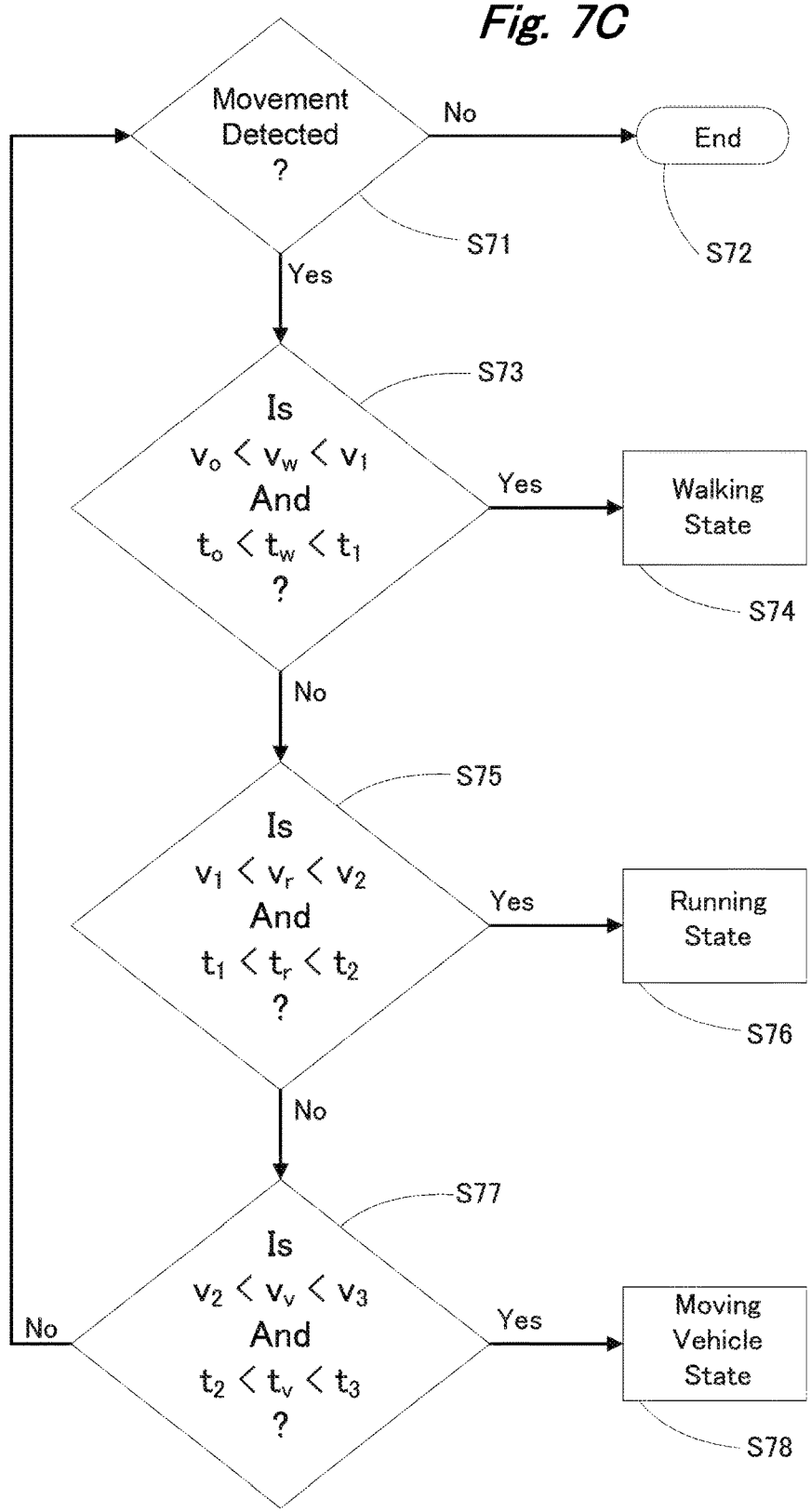
FIG. 7C is an algorithm for detecting movement and the type of movement of an electronic device according to an embodiment.

FIG. 7C is an algorithm for detecting movement and the type of movement of the electronic device 100. In step S71, it is determined whether a movement has occurred. Movement occurs when the electronic device 100 being held by a user in a static state experiences an acceleration, as determined by the motion sensor 108 of the electronic device 100. This movement can be determined in a relatively short period of time $t_o$, such as within 100 ms. If movement is not detected within time $t_o$ (a "no" decision in step S71), the process proceeds to step S72 and the process ends. If movement is detected within time $t_o$ (a "yes" decision in step S71), the process proceeds to step S73.

After it has been determined that movement occurred, it is desirable to determine the type of movement, such as walking, running, or riding in a vehicle. In step S73, it is determined whether the detected movement is achieved at a particular velocity $v_w$ and the movement is achieved from a static state within a predetermined period of time $t_w$. $V_w$ and $t_w$ are within ranges at which a typical walking state would be achieved from a static state. For example, a time period in which a walk can be determined is approximately two seconds. A time range for $t_w$ might be from zero seconds at $t_o$ to three seconds at $t_1$, given for illustrative purposes only. During this ramp-up time period, a velocity of approximately two miles per hour could be a typical velocity for a walking state. In the example described above, a user would enter a walking state of two miles per hour within two seconds from a static state. The walking velocity, $v_w$ is within a range from zero velocity, $v_o$ to a maximum velocity, $v_1$ to be considered a walking state. An example velocity range for a walking state, given for illustrative purposes only, could be zero to five miles per hour. If the velocity, $v_w$ is within a pre-determined range of $v_0$ to v and the ramp-up time from a static state, $t_w$ is within a pre-determined range of $t_0$ to $t_1$ (a "yes" decision in step S73), the process proceeds to step S74 where the movement is defined as a walking state. If the velocity $v_w$ is not within the pre-determined range of $v_0$ to $v_1$ or the ramp-up time from a static state, $t_w$ is not within the pre-determined range of $t_0$ to $t_1$ (a "no" decision in step S73), the process proceeds to step S75.

In step S75, it is determined whether the detected movement is achieved at a particular velocity $v_r$ and within a predetermined period of time $t_r$ from a static state. $V_r$ and $t_r$ are within ranges at which a typical running state would be achieved from a static state. A running velocity, $v_r$, is within a range from $v_1$ to $v_2$, wherein $v_1$ is the maximum pre-determined velocity for a walking state. A running state ramp-up time, $t_r$, is within a range from $t_1$ to $t_2$, wherein $t_1$ is the maximum pre-determined ramp-up time for a walking state. As illustrated in FIG. 7B, the acceleration during the ramp-up time is larger for a running state than for a walking state. The initial acceleration rate to reach a desired running pace is greater than for a walking state. In addition, there is a larger range of running velocities, ranging from a slow jog to a racing sprint. An exemplary range of running ramp-up times, $t_1$ to $t_2$ could range from two seconds to ten seconds. An exemplary range of running velocities could range from five miles per hour to twenty miles per hour. The exemplary ranges of running ramp-up times and running velocities are given for illustrative purposes only. Other ranges of running ramp-up times and running velocities are contemplated by embodiments described herein. If the velocity, $v_r$, is within a pre-determined range of $v_1$ to $v_2$ and the ramp-up time, $t_r$, is within a pre-determined range of $t_1$ to $t_2$ (a "yes" decision in step S75), the process proceeds to step S76 where the movement is defined as a running state. If the velocity $v_r$, is not within the pre-determined range of $v_1$ to $v_2$ or the ramp-up time, $t_r$, is not within the pre-determined range of $t_1$ to $t_2$ (a "no" decision in step S75), the process proceeds to step S77.

In step S77, it is determined whether the detected movement is achieved at a particular velocity, $v_v$, and within a pre-determined period of time, $t_v$, from a static state. $V_v$ and $t_v$ are within ranges at which a typical state of riding in a moving vehicle would be achieved from a static state. A vehicle velocity, $v_v$, is within a range from $v_2$ to $v_3$, wherein $v_2$ is at or near the maximum pre-determined velocity for a running state. A moving vehicle state ramp-up time, $t_v$, is within a range from $t_2$ to $t_3$. As illustrated in FIG. 7B, the velocity is much larger for a moving vehicle state than for a running state. However, the ramp-up time may be similar to or slightly larger for a moving vehicle state than for a running state. The ramp-up time, $t_v$, will be longer for a higher desired velocity. The desired velocity of a moving vehicle, $v_2$ to $v_3$ may range from ten miles per hour to seventy miles per hour, depending upon the driving environment. A higher desired velocity will usually require a longer ramp-up time, $t_v$. An exemplary range of moving vehicle ramp-up times, $t_2$ to $t_3$ could range from two seconds to ten seconds. The exemplary ranges of moving vehicle ramp-up times and velocities are given for illustrative purposes only. Other ranges of moving vehicle ramp-up times and velocities are contemplated by embodiments described herein. If the velocity, $v_v$, is within a pre-determined range of $v_2$ to $v_3$ and the ramp-up time, $t_v$, is within a pre-determined range of $t_2$ to $t_3$ (a "yes" decision in step S77), the process proceeds to step S78 where the movement is defined as a moving vehicle state. If the velocity, $v_v$, is not within the pre-determined range of $v_2$ to $v_3$ or the ramp-up time, $t_v$, is not within the pre-determined range of $t_2$ to $t_3$ (a "no" decision in step S77), the process returns to step S71.

Figure 8:
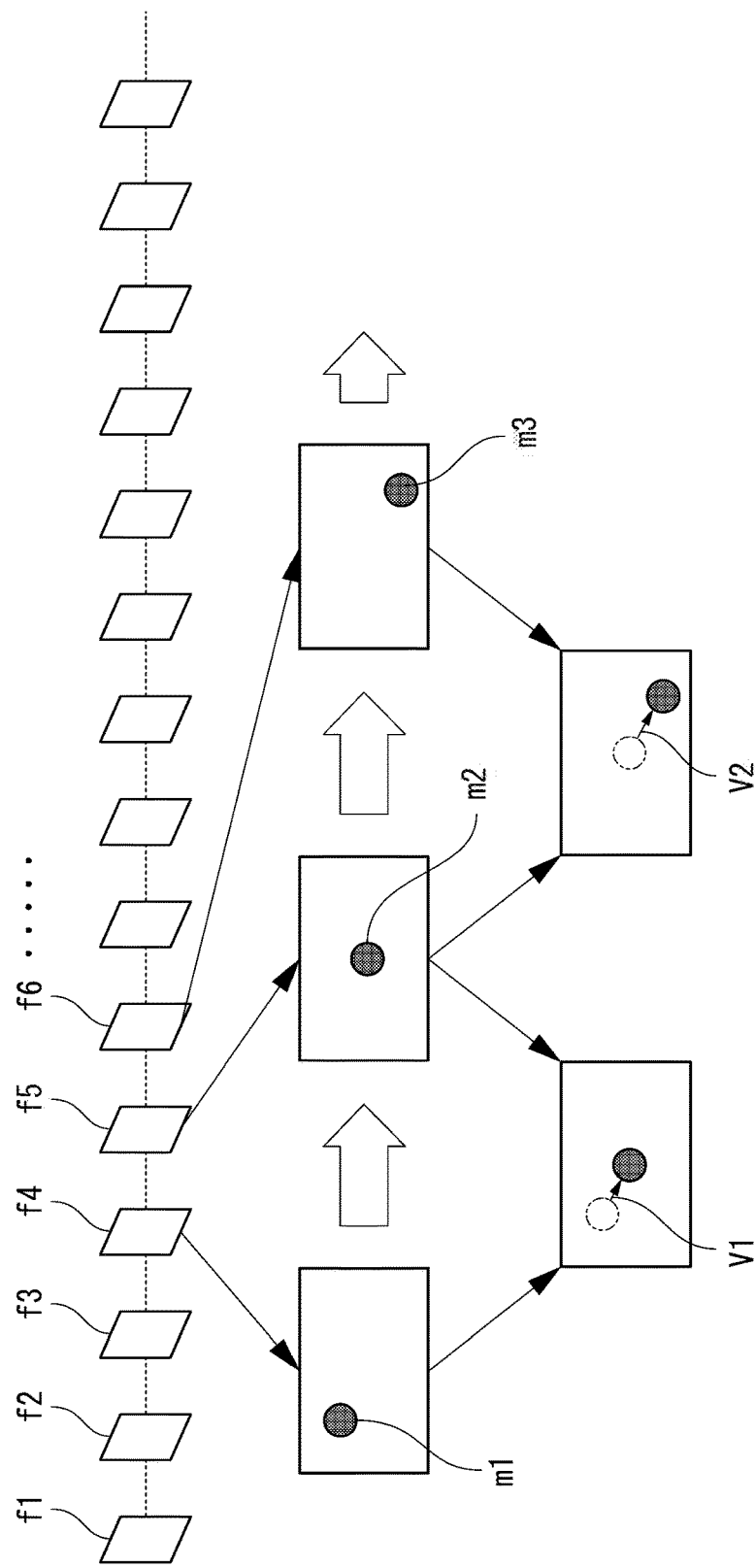
FIG. 8 illustrates a controller detecting a motion vector from a series of image frames according to an embodiment.

FIG. 8 illustrates a controller 110 detecting a motion vector from a series of image frames captured by the camera section 109. In a fixed period of time, the camera 109 captures a series of images and outputs image data f1, f2, f3, etc. of sequential frames. In FIG. 8, an object m1 is detected by an image data f4. An object m2 is detected by an image data f3, which illustrates a moved position from the image data f4. As a result, a motion vector v1 is determined from a difference in position of the two objects m1 and m2. An object m3 is detected by an image data f6, which illustrates a moved position from the image data f5. As a result, a motion vector v2 is determined from a difference in position of the two objects m2 and m3. With reference to a moving electronic device, m1, m2, and m3 can represent objects, people, or structures that may be encountered by a user holding the electronic device while moving. In addition, the object or person encountered by the user may also be moving. Therefore, a motion vector of the encountered object or person can also be considered as a separate motion vector, in addition to motion by the user holding the electronic device 100.

Figure 9A:
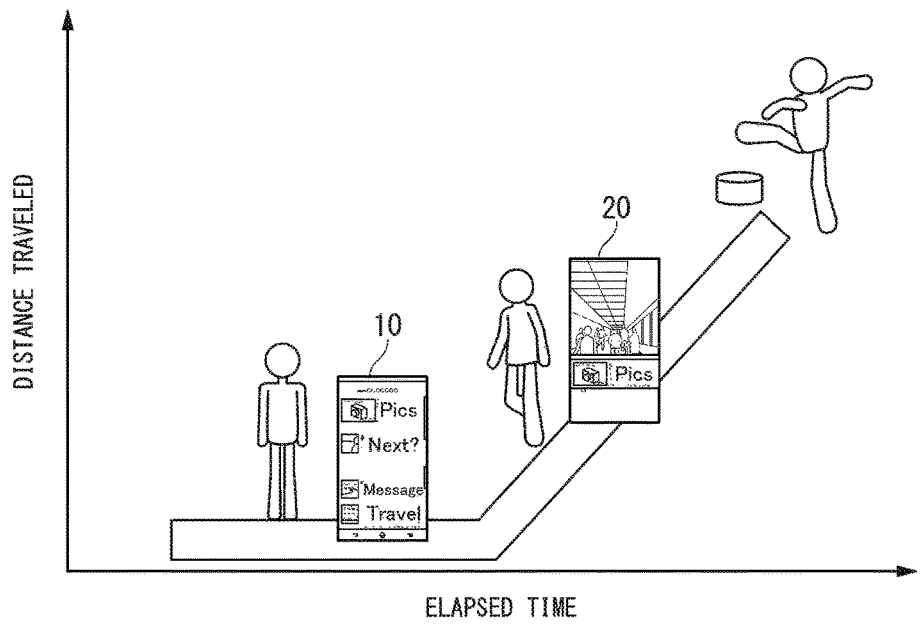
FIGS. 9A-9B illustrate a change in a user's motion according to an embodiment.
Figure 9B:
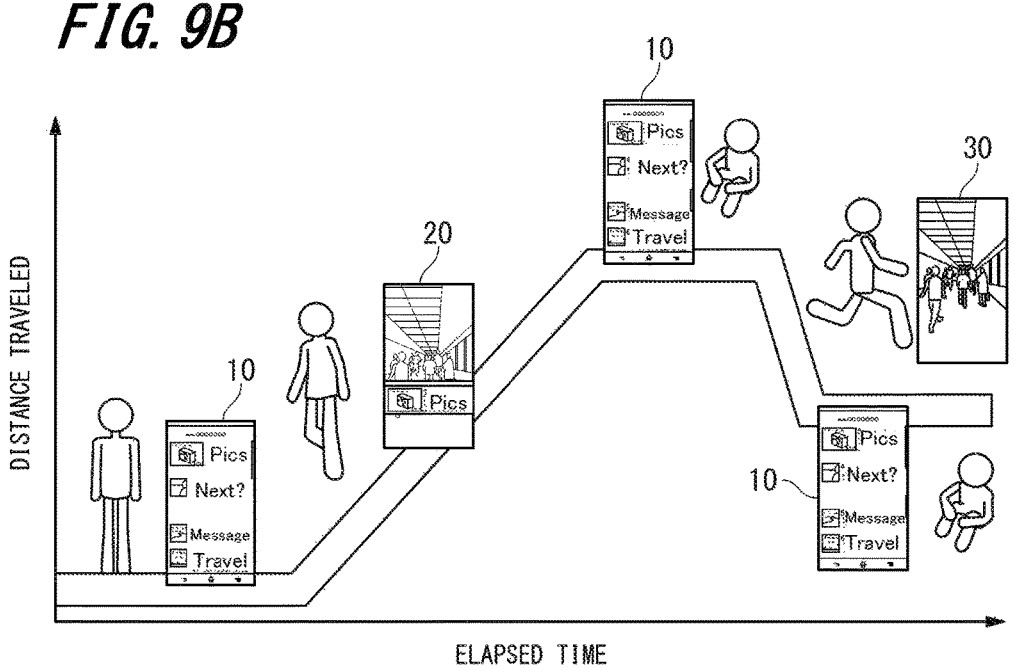

FIGS. 9A-9B illustrate a change in a user's motion while holding the electronic device 100, and a corresponding, display on the electronic device 100 during the change in motion by the user. The vertical axes illustrate the distance travelled and the horizontal axes illustrate the time elapsed while the user is holding the electronic device 100. FIG. 9A illustrates a user initially in a static state, and later moves to a walking state. During the static state, an image 10 is displayed on the display panel 120 of the user's electronic device 100, and only includes applications in which the user is working. When the user enters into a walking state, an image 20 is displayed on the display panel 120, which is a combined image of applications in which the user is working and the user's real-time surroundings. Objects, structures, or other people that are approaching the user during the walking state are displayed in the combined image 20. This provides a visual alert to the user while he/she is operating the electronic device 100 and therefore, assists with avoiding a collision or entering a potentially dangerous situation.

FIG. 9B illustrates the user entering back into a static state. As a result, the image 10 is displayed on the display panel 120 again, containing applications in which the user is working without an image of the user's surroundings. The user subsequently enters into a running state from a static state, wherein an image 30 is displayed on the display panel 120 of the electronic device 100. The entire image is devoted to the user's surroundings so the user can completely focus on his/her surroundings to avoid a collision or a potentially dangerous situation. In another embodiment, the image 30 of the user's surroundings could provide a telescopic view of his/her surroundings. This would allow the user to directly view the immediate close-up surroundings, plus provide a view of the forthcoming surroundings farther away on the display panel 120 of the electronic device 100. FIG. 9B illustrates the user subsequently enters a static state again after the running state. As a result, the image 10 containing applications in which the user is working without an image of the user's surroundings is displayed on the display panel 120 of the electronic device 100.

FIGS. 10A-10C illustrate the mechanisms by which a user is alerted as a result of captured image(s) by the camera section 109. FIG. 10A illustrates three objects m11, m12, and m13 captured in a frame by the camera section 109 of the electronic device 100. FIG. 10B illustrates three motion vectors v11, v12, and v13 for the respective three objects m11, m12, and m13. The motion vectors v11, v12, and v13 are determined from a change in motion of the objects m11, m12, and m13 relative to the moving user holding the electronic device 100.

FIG. 10B illustrates object m11 is moving away and to the right of the user's environment. Object m12 is moving straight towards the user, and object m13 is moving towards the user and to the left of the user's environment. The controller 110 also determines the distance from each of the objects to the user, which is displayed along a side of the display panel 120. The display panel 120 can further indicate a range of distances, such as grid markings or background patterns. In FIG. 10B, a first range of distances is 0-5 meters, a second range of distances is 5-10 meters, and a third range of distances is 10-20 meters. These ranges are given for illustrative purposes only. Other shorter or longer ranges and more or fewer ranges in number are contemplated by embodiments described herein.

The motion vectors v11, v12, and v13 provide information about the objects m11, m12, and m13 relative to the user. For example, m11 is moving away from the user rather than towards the user, i.e. a stationary object would appear to be moving towards the user on the display panel 120 rather than away from the user. Therefore, m11 is probably a moving object or moving person. Object m12 is moving straight towards the user on the display panel 120. Therefore, object m12 is probably an affixed structure or a standing person. Objects m11 and m13 are both moving towards the interior of the user's surroundings on the display panel 120. M11 is moving to the right and m13 is moving to the left. Therefore, objects m11 and m13 are probably moving objects or persons.

The controller 110 of the electronic device 100 can set a level of danger, based on the range of distances of an object to the user. For example, the closest range to the user, 0-5 meters can be defined as the highest danger level, the next range of 5-10 meters can be defined as a second-level danger, and the most distant range of 10-20 meters can be defined as the lowest danger level. Other ranges and numbers of ranges are contemplated by embodiments described herein for pre-determined danger levels. In FIG. 10B, object m12 is the closest object to the user and is in the range of 5-10 meters. Vector v12 illustrates object m12 will be entering the highest danger zone soon. The controller 110 of the electronic device 100 alerts the user of this close impending object.

An embodiment can include an image recognition system in which a structure, such as a vertical beam, utility pole, guard rail, parked vehicle, or other static structure is differentiated from a person. In addition, moving objects can be differentiated between a person, a bicycle, a mechanized utility cart, etc. Another embodiment can incorporate the velocity of the moving objects in addition to their direction of movement and their distance from the user. For example in FIG. 10B, m13 appears to be a person or object moving towards the user, whereas m12 appears to be a static structure or person. Therefore, m13 may collide with the user before m12, even though m13 is farther away at a particular instant. In addition, m11 appears to be moving away from the user. Therefore, the user may never come into contact with m11, even though m11 is relatively close to the user at a particular instant.

FIG. 10C illustrates the object m12 becomes bolder and brighter in appearance on the display panel 120. Object m12 is displayed with a high level of luminance to alert the user of the impending object. Other alert forms include, but are not limited to a bold perimeter, a flashing object, an audible signal with the image alert, and/or a vibratory signal. A second closest object m13 could be luminesced or bolded at a lower level than the closest object. In addition, other signals such as an audible signal or a vibratory signal would probably not be used for a second closest object, such as object m13.

Figure 11:
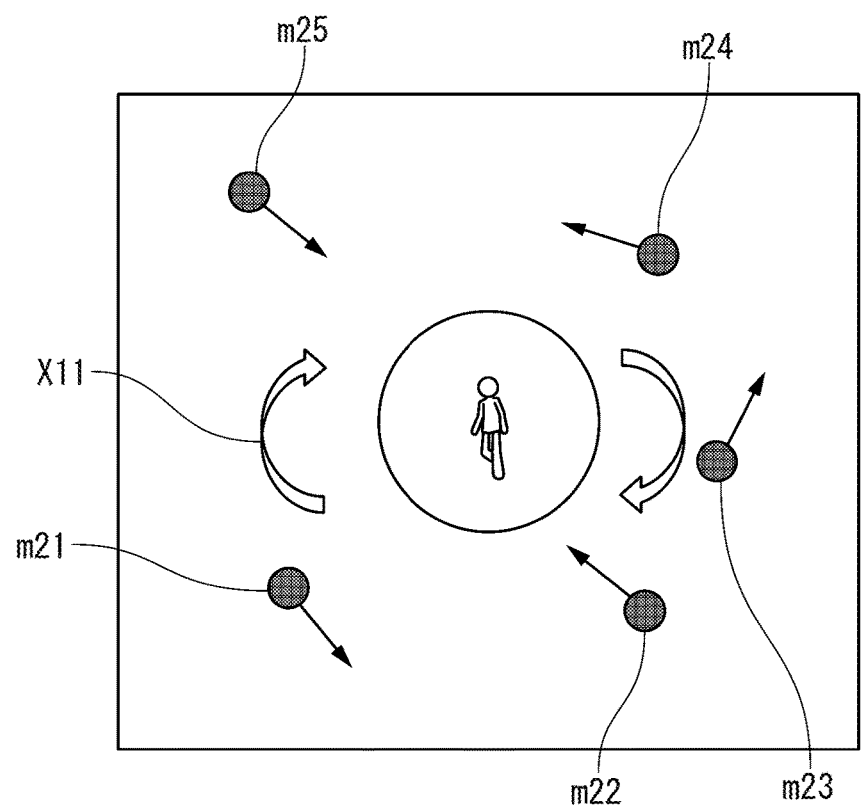
FIG. 11 illustrates the detection of a motion vector according to an embodiment.

FIG. 11 illustrates the detection of a motion vector. When the controller 110 of the electronic device 100 detects a motion as a result of motion from a user holding the electronic device 100, the controller 110 adjusts the direction of a motion vector of an object in accordance with the user's new point-of-view. FIG. 11 illustrates objects m21, m22, m23, m24, and m25 within a user's environment. One of the objects is detected from an image captured by the camera section 109, which appears on the display panel 120 of the electronic device 100. If the user changes his/her viewing direction as illustrated by the arrow X11, the motion sensor 108 of the electronic device 100 detects the rotation X11 of the user. Subsequently, the motion vectors of each object m21, m22, m23, m24, and m25 are corrected to coincide with the user's rotation X11. Therefore, objects will be flagged as closest, next closest, etc. according to the rotation X11 and the user's new viewing direction.

FIGS. 12A-12B illustrate correction of a motion vector. In FIG. 12A, an image f31 is captured by the camera section 109 of the electronic device 100, which displays an object m31 in the right portion of image f31. There was no movement by a user holding the electronic device 100 during capture of image f31. In FIG. 12B, movement of the user holding the electronic device 100 occurred prior to capture of image f32, illustrating object m32 in the left portion of image f32. When there is no correction of the user movement, the controller 110 of the electronic device 100 detects a motion vector by a difference in position of object m31 from object m32. However, when movement or rotation of the user is considered, correction of the motion vector for m31 and m32 determines that there was no movement between m31 and m32.

Figure 13:
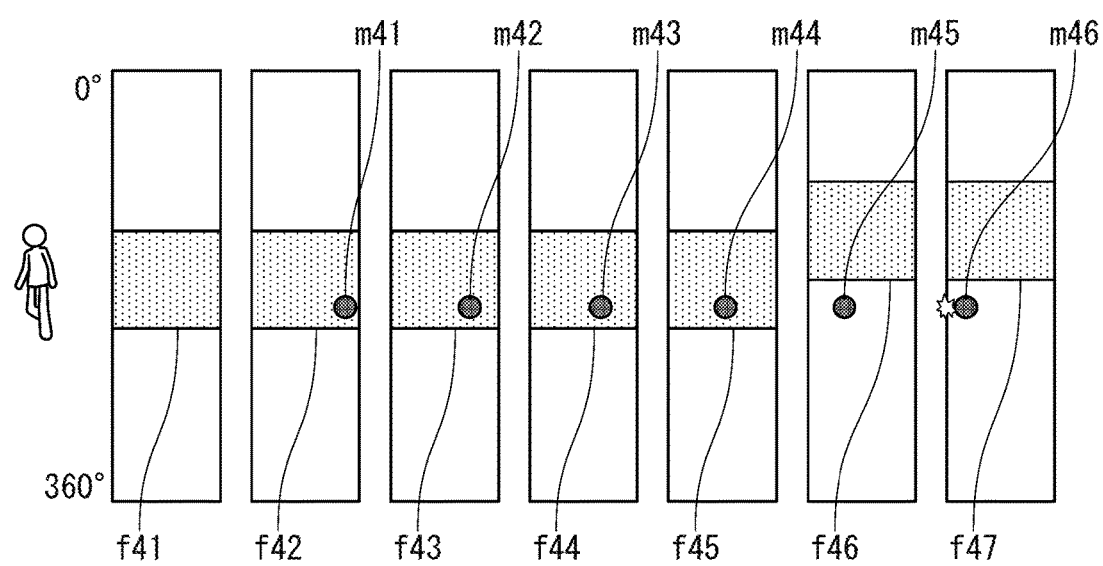
FIG. 13 illustrates determination of a motion vector outside a field-of-view of a captured image according to an embodiment.

FIG. 13 illustrates determination of a motion vector outside a field-of-view of a captured image. A series of images f41-f47 illustrate capturing the image of an object. Images f42, f43, f44, and f45 illustrate capturing respective objects m41, m42, m43, and m44, wherein the four objects are slightly moving to the left of the camera field-of-view. After, the capture of image f45, the electronic device 100 moves, which results in objects m45 and m46 being outside of the field-of-view when images f46 and f47, respectively are captured by the camera section 109 of the electronic device 100. However, the controller 110 of the electronic device 100 estimates the actual positions of objects m45 and m46 from the pattern and time of movement of objects m41-m44 in images f42-f45, respectively. Therefore, a necessary warning process can be performed for m45 and m46 as they come near to the user, even though their images were not actually captured by the camera section 109.

Figure 14:
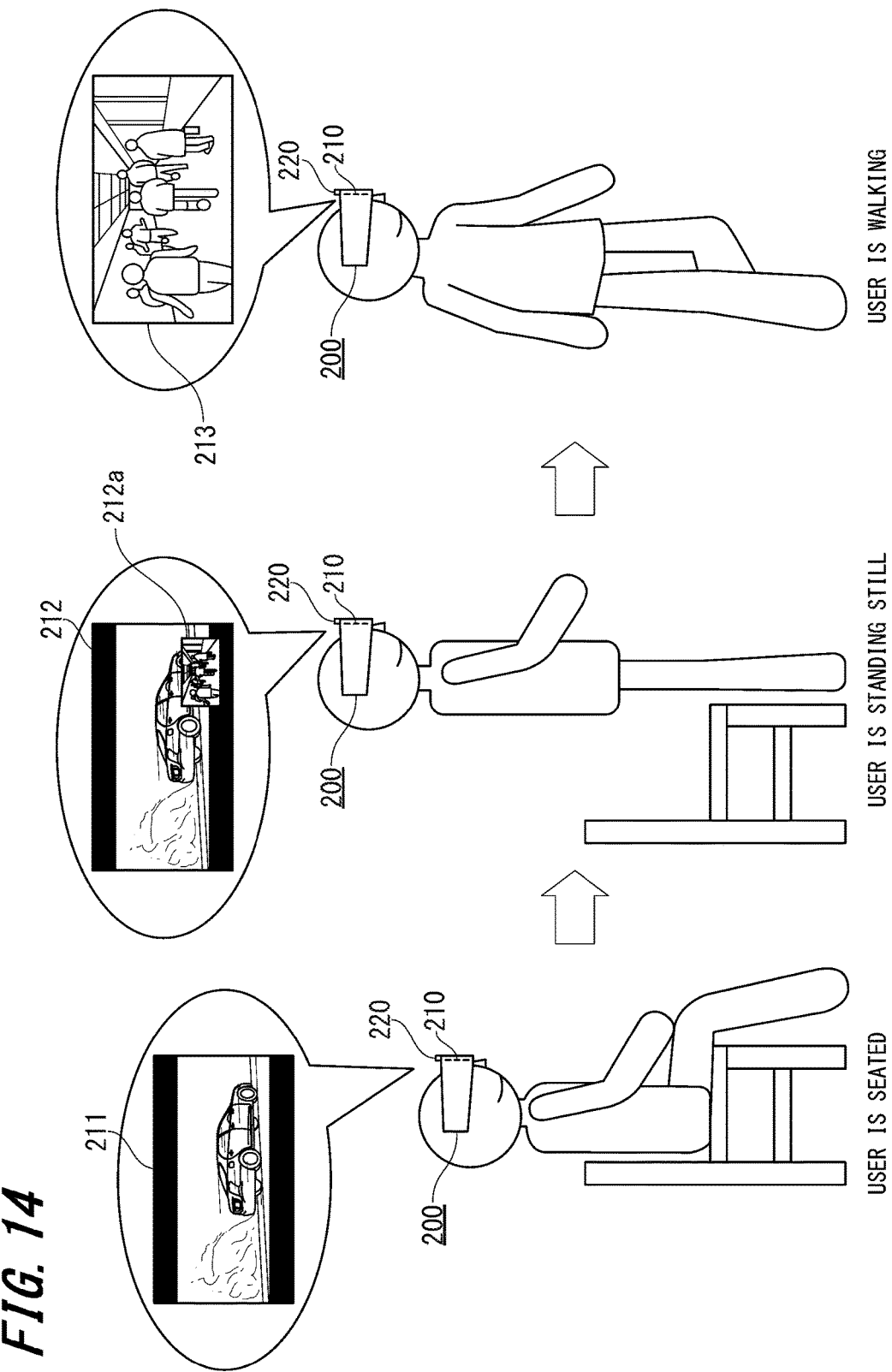
FIG. 14 illustrates a head-mounted electronic device according to an embodiment.

FIG. 14 illustrates a head-mounted electronic device 200 using embodiments described herein. An image is displayed on a display 210 arranged in front of the eyes and to either side of a user. The head mounted electronic device 200 is equipped with a camera 220, which captures front-view surroundings of the user. The components and internal circuitry of the head-mounted electronic device 200 are similar to the electronic device 100 described above. When a user wearing the head-mounted electronic device 200 is at rest in a seated position, as determined by a motion sensor, an image 211 on the display 210 contains content which the user has selected.

When the user wearing the head-mounted electronic device 200 enters into a standing state, the camera 220 captures images of the user's front-view surroundings, which are partially displayed 212a in combination with a partial view 212 of previously selected content. When a user enters into a walking state while wearing the head-mounted electronic device 200, the entire image 213 is directed towards the user's approaching surroundings as captured by camera 220. When the camera 220 captures an image 212 or image 213 of a closely approaching object and a motion vector of the object(s) is determined, warning signals as described above are instituted.

Figure 15:
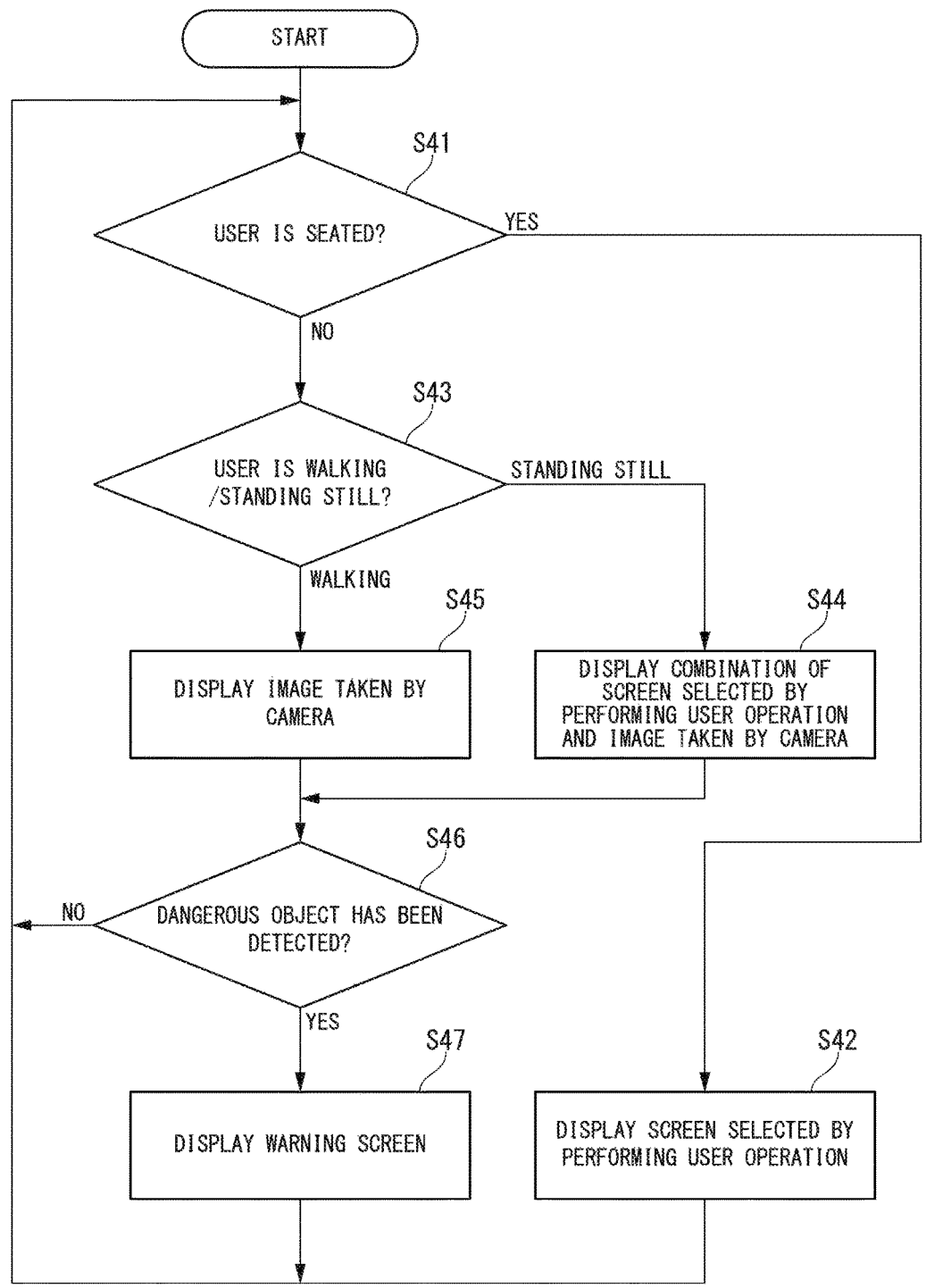
FIG. 15 is an algorithm for displaying an image on a head-mounted electronic device according to an embodiment.

FIG. 15 is an algorithm for displaying an image on a head-mounted electronic device, such as head-mounted electronic device 200. In step S41, it is determined from detection data from a motion sensor of the head-mounted electronic device 200 whether the user wearing the device is seated. If the user is seated (a "yes" decision in step S41), the process proceeds to step S42 and a display screen 210 displays content selected by the user for performing one or more operations. If the user is not seated (a "no" decision in step S41), the process proceeds to step S43. In step S43, it is determined whether the user is walking or standing still. If the user is standing still, the process proceeds to step S44 and a combined image of content selected by user operations and an image captured by the camera 220 is displayed together on display 210. If the user is walking, the process proceeds to step S45 where the camera 220 is activated and an image captured by the camera 220 is displayed on display 210.

When the image from step S44 or step S45 has been displayed, the process proceeds to step S46, where it is determined by a controller of the device whether a dangerous object has been detected from the captured images of the camera 220. If no dangerous object has been detected (a "no" decision in step S46), the process returns to step S41. If a dangerous object has been detected (a "yes" decision in step S46), the process proceeds to step S47 where a warning screen is displayed. When the warning screen has been displayed in step S47 or a screen has been displayed in step S42, the process returns to step S41.

Embodiments described herein provide information and safety precautions for an electronic-focused society. Many times, people are too focused and engaged with their electronic devices and not focused enough on their surroundings. Embodiments described herein bring a user's surroundings into his/her electronic device environment.

Numerous modifications and variations of the present invention are possible in light of the above teachings. The embodiments described with reference to the drawings may be practiced individually or in any combination thereof. It is therefore to be understood that within the scope of the appended claims, the embodiments may be practiced otherwise than as specifically described herein.

The functions, processes, and algorithms described herein may be performed in hardware or software executed by hardware, including computer processors and/or programmable processing circuits configured to execute program code and/or computer instructions to execute the functions, processes, and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet.

Input to the system may be received via direct user input and/or received remotely either in real-time or as a batch process. Additionally, some implementations may be performed on modules or hardware not identical to those described. Accordingly, other implementations are within the scope that may be claimed.

It is noted that, as used in the specification and the appended claims, the singular forms "a," "an," and "the" include plural referents unless the context clearly dictates otherwise.

The above disclosure also encompasses the embodiments noted below.

(1) An electronic device comprising a camera configured to capture image data; a display configured to display the captured image data and content corresponding to an application of the electronic device; a motion sensor configured to detect motion of the electronic device; and circuitry configured to activate the camera when motion is detected by the motion sensor, and control the display to display at least a portion of the captured image data at a size proportional to an amount of motion as detected by an output of the motion sensor.

(2) The electronic device according to (1), wherein the circuitry is further configured to determine whether the detected motion is one of a walking state, a running state, or a vehicle riding state.

(3) The electronic device according to (1) or (2), wherein the circuitry is further configured to display a captured image of a user's environment on the display when a running state is detected.

(4) The electronic device according to any one of (1) to (3), wherein the circuitry is further configured to display a combined display of a captured transparent image of a user's environment and content of one or more working applications on the display when a walking state is detected, wherein a back layer of the display can be viewed through the captured transparent image.

(5) The electronic device according to any one of (1) to (4), wherein the circuitry is further configured to detect an approaching object from the captured image data of the camera and to issue a warning of the approaching object.

(6) The electronic device according to any one of (1) to (5), wherein the circuitry is further configured to detect a motion vector of the approaching object from the captured image data of the camera.

(7) The electronic device according to any one of (1) to (6), wherein the issued warning comprises one or more of an illumination of the approaching object, a flashing approaching object, an audible signal, or a vibratory signal.

(8) The electronic device according to any one of (1) to (7), wherein the motion sensor is further configured to detect a change in a viewing direction of the camera.

(9) The electronic device according to any one of (1) to (8), wherein the circuitry is further configured to detect the change in viewing direction of the camera and to adjust a motion vector of an approaching object according to the change in viewing direction.

(10) The electronic device according to any one of (1) to (9), wherein the circuitry is further configured to detect an approaching object out of view of the camera based on a time and position of the approaching object from previously captured images.

(11) The electronic device according to any one of (1) to (10), wherein the electronic device comprises, a handheld electronic device.

(12) The electronic device according to any one of (1) to (11), wherein the circuitry is further configured to detect a walking state when an acceleration of the electronic device changes from a static state to a first threshold level.

(13) The electronic device according to any one of (1) to (12), wherein the circuitry is further configured to detect a running state when an acceleration of the electronic device changes from the first threshold level to a second threshold level.

(14) The electronic device according to any one of (1) to (13), wherein the circuitry is further configured to detect a vehicle riding state when an acceleration of the electronic device changes from the second threshold level to a third threshold level.

(15) The electronic device according to any one of (1) to (14), wherein the electronic device comprises a head-mounted electronic device.

(16) The electronic device according to any one of (1) to (15), wherein the circuitry is further configured to determine when the electronic device changes a position from a seated user-perspective position to a standing user-perspective position.

(17) The electronic device according to any one of (1) to (16), wherein the circuitry is further configured to change the display of the electronic device from a full image of user-selected content while in the seated user-perspective position to a combined image of the user-selected content and a transparent image of the electronic device's surroundings while in the standing user-perspective position, wherein a back layer of the display can be viewed through the transparent image.

(18) The electronic device according to any one of (1) to (17), wherein the circuitry is further configured to determine when the electronic device changes to a walking state and to display a full image of the electronic device's surroundings.

(19) A displaying method of an electronic device comprises detecting via a motion sensor, a motion of the electronic device; capturing via a camera, image data of a front-view image from the electronic device, subsequent to the detecting; determining via circuitry to display an amount of the captured image data at a size proportional to an amount of motion as detected by an output of the motion sensor; and displaying the determined amount of the captured image data on the display.

(20) A computer-readable storage medium having computer-readable instructions embodied thereon, that when executed by a computing device, executes a method comprising detecting via a motion sensor, a motion of the electronic device; capturing via a camera, image data of a front-view image from the electronic device, subsequent to the detecting; determining via circuitry to display an amount of the captured image data at a size proportional to an amount of motion as detected by an output of the motion sensor; and displaying the determined amount of the captured image data on the display.

The invention claimed is:

1. An electronic device, comprising:
a camera configured to capture image data;
a display;
a motion sensor configured to detect motion of the electronic device; and
circuitry configured to
control the display to display a content corresponding to an application of the electronic device in response to an output of the motion sensor indicating that the electronic device is in a static state;
control the camera to be activated and control the display to display the content in a first area of the display and the captured image data in a second area of the display in response to the output of the motion sensor indicating that the electronic device is in a walking state; and
control the camera to be activated and control the display to display the captured image data without display of the content in response to the output of the motion sensor indicating that the electronic device is in a running state.

2. The electronic device of claim 1, wherein the circuitry is further configured to detect an approaching object from the captured image data of the camera and to issue a warning of the approaching object.

3. The electronic device of claim 2, wherein the circuitry is further configured to detect a motion vector of the approaching object from the captured image data of the camera.

4. The electronic device of claim 2, wherein the issued warning comprises one or more of an illumination of the approaching object, a flashing approaching object, an audible signal, or a vibratory signal.

5. The electronic device of claim 1, wherein the motion sensor is further configured to detect a change in a viewing direction of the camera.

6. The electronic device of claim 5, wherein the circuitry is further configured to detect the change in viewing direction of the camera and to adjust a motion vector of an approaching object according to the change in viewing direction.

7. The electronic device of claim 1, wherein the circuitry is further configured to detect an approaching object out of view of the camera based on a time and position of the approaching object from previously captured images.

8. The electronic device of claim 1, wherein the electronic device comprises a handheld electronic device.

9. The electronic device of claim 1, wherein the electronic device comprises a head-mounted electronic device.

10. The electronic device of claim 9, wherein the circuitry is further configured to determine when the electronic device changes a position from a seated user-perspective position to a standing user-perspective position.

11. The electronic device of claim 10, wherein the circuitry is further configured to control the display to change from display of a full image of the content while in the seated user-perspective position to a combined image of the content and a transparent image of the electronic device's surroundings while in the standing user-perspective position, wherein a back layer of the display is viewable through the transparent image.

12. The electronic device of claim 10, wherein the circuitry is further configured to determine when the electronic device changes to the running state and to display a full image of the electronic device's surroundings.

13. A method of using an electronic device including a camera, a display, a motion sensor, and circuitry, the method comprising:
capturing image data with the camera;
detecting, using the motion sensor, motion of the electronic device;
controlling, using the circuitry, the display to display a content corresponding to an application of the electronic device in response to an output of the motion sensor indicating that the electronic device is in a static state;
controlling, using the circuitry, the camera to be activated and the display to display the content in a first area of the display and the captured image data in a second area of the display in response to the output of the motion sensor indicating that the electronic device is in a walking state; and controlling, using the circuitry, the camera to be activated and the display to display the captured image data without display of the content in response to the output of the motion sensor indicating that the electronic device is in a running state.

14. A non-transitory, computer-readable storage medium storing instructions that, when executed on an electronic device including a camera, a display, a motion sensor, and circuitry, control the electronic device to carry out a method comprising:

capturing image data with the camera;

detecting, using the motion sensor, motion of the electronic device;

controlling, using the circuitry, the display to display a content corresponding to an application of the electronic device in response to an output of the motion sensor indicating that the electronic device is in a static state;

controlling, using the circuitry, the camera to be activated and the display to display the content in a first area of the display and the captured image data in a second area of the display in response to the output of the motion sensor indicating that the electronic device is in a walking state; and controlling, using the circuitry, the camera to be activated and the display to display the captured image data without display of the content in response to the output of the motion sensor indicating that the electronic device is in a running state.

15. The electronic device of claim 1, wherein the motion sensor is configured to detect a cycle of vibration of the electronic device.

16. The electronic device of claim 15, wherein the circuitry is configured to detect a change of the state of a user and activate the camera based on the cycle of vibration detected by the motion sensor.

17. The electronic device of claim 1, wherein the motion sensor is configured to detect a size and cycle of vibration of the electronic device.

18. The electronic device of claim 17, wherein the circuitry is configured to detect a change of the state of a user and activate the camera based on the cycle of vibration detected by the motion sensor.

19. The electronic device of claim 18, wherein the circuitry is configured to control the display to display at least a portion of the captured image data at a size that increases as the size and cycle of vibration of the electronic device increases.

* * * * *